Figure 1:
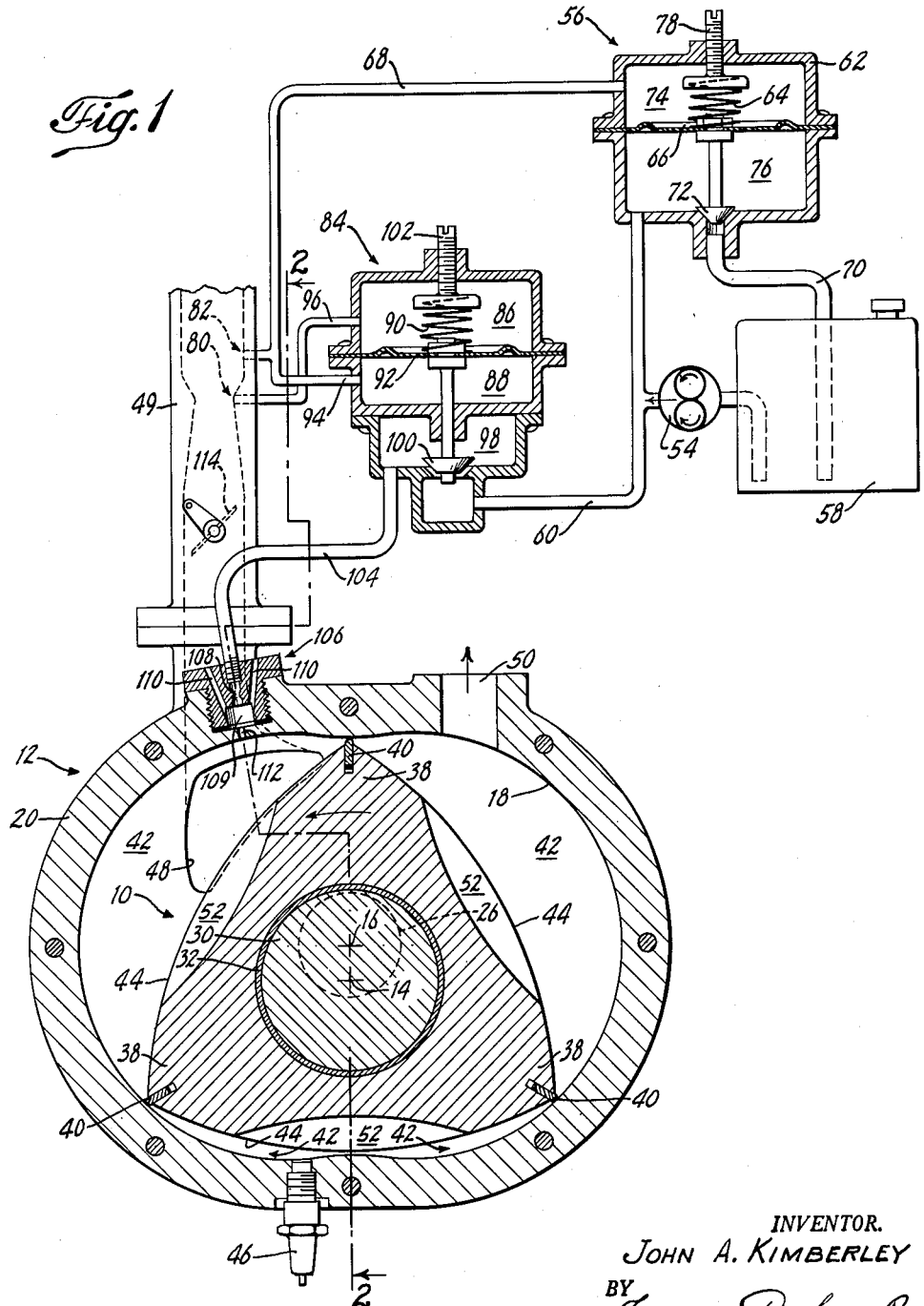

March 31, 1964  J. A. KIMBERLEY  3,126,876
FUEL INJECTION SYSTEMS FOR ROTARY COMBUSTION ENGINES
Filed Jan. 16, 1962  2 Sheets-Sheet 1

INVENTOR.
JOHN A. KIMBERLEY
BY
Morgan, Finnegan, Durham & Pine
ATTORNEYS.

March 31, 1964   J. A. KIMBERLEY   3,126,876
FUEL INJECTION SYSTEMS FOR ROTARY COMBUSTION ENGINES
Filed Jan. 16, 1962   2 Sheets-Sheet 2

INVENTOR.
JOHN A. KIMBERLEY
BY
Morgan, Finnegan, Durham & Pine
ATTORNEYS.

United States Patent Office

3,126,876
Patented Mar. 31, 1964

3,126,876
FUEL INJECTION SYSTEMS FOR ROTARY
COMBUSTION ENGINES
John A. Kimberley, Wayne, N.J., assignor to Curtiss-
Wright Corporation, a corporation of Delaware
Filed Jan. 16, 1962, Ser. No. 166,543
10 Claims. (Cl. 123—8)

The present invention relates to fuel injection systems for rotary combustion engines, and more particularly to fuel injection systems for continuously injecting fuel directly into the working chambers of the engine.

This invention is applicable to and useful in almost any type of rotary internal combustion engine in which a rotor or inner body rotates relative to a stationary outer body to provide variable volume working chambers in the space between the rotor and the outer body. It is particularly useful in the type of rotary combustion engine that will be described below as the preferred embodiment of the invention.

To simplify and clarify the explanation of the invention, the description which follows will, for the most part, be restricted to the use of the invention in a rotary combustion engine of the type described in the preferred embodiment.

It will be apparent from the description, however, that with slight modifications which would be obvious to a person skilled in the art, the invention is equally applicable to other types of rotary internal combustion engines in whch the rotor or inner body rotates relative to a stationary outer body to form variable volume working chambers in the space between the two bodies.

The present invention is particularly useful in rotary internal combustion engines of the type that comprise an outer body having an axis, axially-spaced end walls, and a peripheral wall interconnecting the end walls. In such rotary combustion engines the inner surfaces of the peripheral wall and the end walls form a cavity, and the engine includes an inner body or rotor that is mounted within the cavity between its end walls.

The axis of the inner body or rotor is eccentric from and parallel to the axis of the cavity of the outer body, and the rotor has axially-spaced end faces disposed adjacent the end walls of the outer body, and a plurality of circumferentially-spaced apex portions. The rotor is rotatable relative to the outer body, and its apex portions substantially continuously engage the inner surface of the outer body to form a plurality of working chambers that vary in volume during engine operation as a result of relative rotation between the rotor and the outer body.

The inner surface of the peripheral wall of the outer body has a multi-lobed profile that is preferably basically an epitrochoid, and the number of lobes on this epitrochoid is one less than the number of apex portions of the inner body or rotor.

The rotary internal combustion engine includes an intake passage means for administering a fuel-air mixture to the variable volume working chambers, an exhaust passage means communicating with the working chambers, and suitable ignition means so that during engine operation the working chambers of the engine undergo a cycle of operation which includes the four phases of intake, compression, expansion, and exhaust.

This cycle of operation is achieved as a result of the relative rotation of the inner body or rotor and outer body, and for this purpose, both the inner body or rotor and outer body may rotate at different speeds but preferably the inner body or rotor rotates while the outer body is stationary. The present invention is limited to use in combination with a type of rotary combustion engine in which the inner body or rotor rotates while the outer body is stationary. This type of rotating combustion engine is also the most usual form that the engine takes in practical applications.

For efficient operation of the engine, its working chambers should be sealed, and, therefore, an effective seal is provided between each rotor apex portion and the inner surface of the peripheral wall of the outer body, as well as between the end faces of the rotor and the inner surfaces of the end wall of the outer body.

Between the apex portions of its outer surface, the rotor has a contour which permits its rotation relative to the outer body free of mechanical interference with the multi-lobed inner surface of the outer body. The maximum profile which the outer surface of the rotor can have between its apex portions and still be free to rotate without interference is known as the "inner envelope" of the multi-lobed inner surface, and the profile of the rotor which is illustrated in the accompanying drawings approximates this "inner envelope."

For purposes of illustration, the following description will relate to the present preferred embodiment of the engine in which the inner surface of the outer body defines a two-lobed epitrochoid, and in which the rotor or inner body has three apex portions and is generally triangular in cross-section but has convexly curved or arcuate sides.

It is not intended that the invention be limited, however, to the form in which the inner surface of the outer body approximates a two-lobed epitrochoid, and the inner body or rotor has only three apex portions. In other embodiments of the invention the inner surface of the outer body may have a different plural number of lobes with a rotor having one more apex portion than the inner surface of the outer body has lobes.

In the rotary combustion engine there is an area of the inner surface of the outer body adjacent the intake port in which the pressure is always less than atmospheric or ambient pressure. There is, thus, an area of the inner surface of the outer body that always exhibits a pressure that is less than the atmospheric or ambient pressure or "carburetor top deck pressure." Because of this phenomenon of the rotary combustion engine, it is possible to create a fuel system that is vented to carburetor top deck pressure and that will always experience a pressure drop between its reference pressure (carburetor top deck pressure) and this area of the inner surface of the outer body at which a pressure lower than ambient is always present.

It is a primary object of the present invention to provide a novel fuel injection system in combination with a rotary combustion engine that will permit low pressure continuous discharge of fuel (normally atomized) directly into a working chamber of the engine. This invention permits the injection of the fuel to be continuous, i.e., without interruption, and directly into the engine working chamber within an area of the engine chamber in which the pressure is always a negative or a suction pressure, i.e., less than ambient or atmospheric pressure.

Another object of the instant invention is to provide a novel fuel injection system for rotary combustion engines in which the working chamber pressure experienced at the injection nozzle will always be below atmospheric pressure thus ensuring that the atomized fuel air mixture is always carried into the working chamber of the engine.

It is another object of this invention to provide a novel fuel injection system for rotary combustion engines that permits low pressure direct injection of fuel continuously into a working chamber of the engine so that the fuel vaporizes within the engine chamber and helps to cool the chamber.

It is another object of this invention to provide a novel low pressure fuel injection system for rotary combustion engines in which the nozzle of the fuel injection system discharges the fuel directly into the engine chamber continuously at a location that is adjacent to or downstream of the air intake port thereby improving the breathing of the engine by cooling the air charge downstream of the intake port through vaporization of the fuel within the engine chamber.

It is another object of this invention to provide a novel fuel injection system for rotary combustion engines that permits continuous and direct injection of fuel into the engine chambers to avoid and eliminate the problems of manifold wetting and carburetor icing.

It is a further object of this invention to provide a novel fuel injection system for rotary combustion engines that includes an injection nozzle that provides a predictable pressure on the fuel flow control that is independent of engine operating conditions, and is nevertheless, a low pressure nozzle.

It is a still further object of this invention to provide a novel fuel injection system for rotary combustion engines that permits direct and continuous injection of fuel into the engine chambers and makes possible the use of inexpensive low pressure, air atomizing fuel nozzles.

To achieve the foregoing objects, and in accordance with its purpose, this invention provides means that as embodied and broadly described, comprise a rotary combustion engine including a fuel injection system comprising a fuel pump means to give pressure for fuel injection, fuel control means to measure the fuel being fed to the engine as a function of the differential between venturi throat pressure and ambient pressure, and fuel injection nozzle means that is located to inject fuel at the inner surface of the outer body in an area of the inner surface of the outer body that always experiences a pressure below ambient pressure, and the fuel injection means being adapted to continuously inject fuel directly into the engine working chambers.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

The invention consists in the novel parts, constructions, arrangements, combinations, and improvements shown and described.

The accompanying drawings which are incorporated in and constitute a part of the specification, illustrate one embodiment of the invention, and together with the description serve to explain the principles of the invention.

Figure 2:
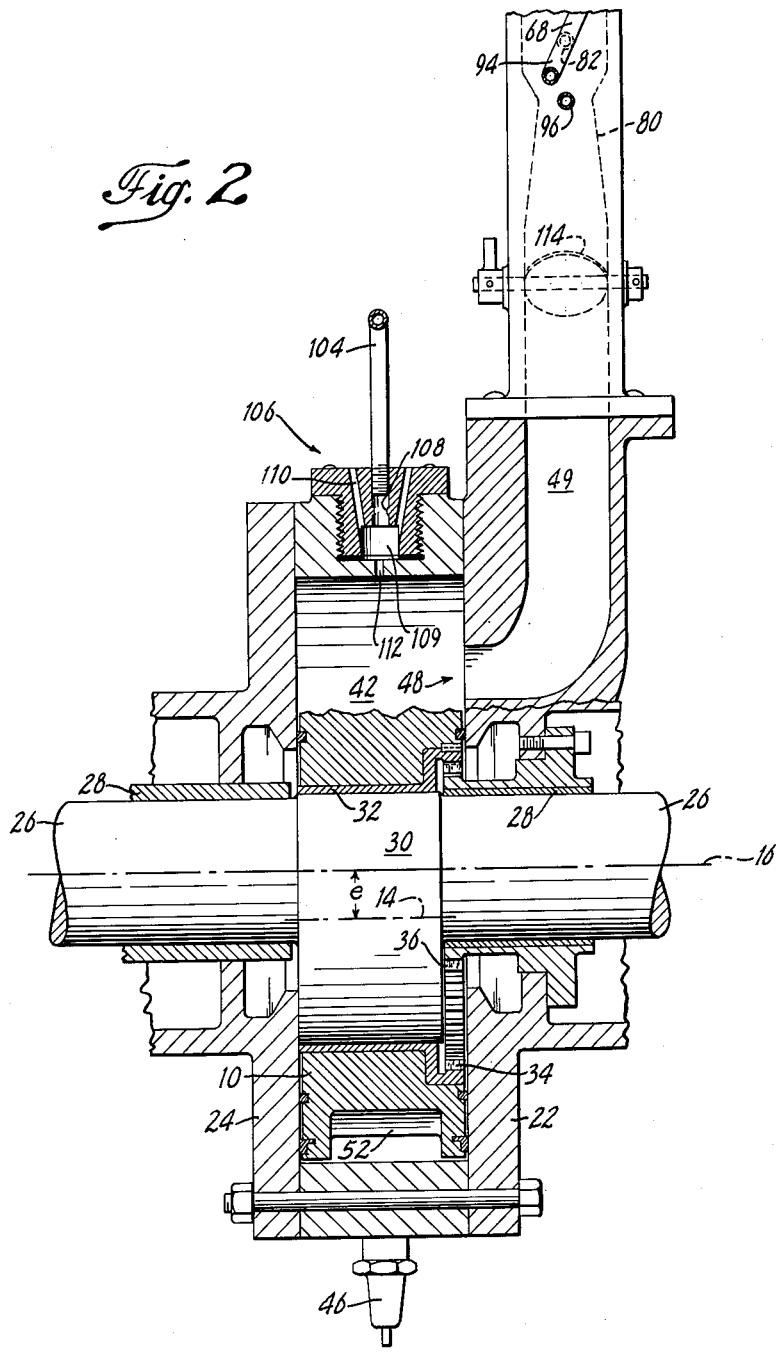

Of the drawings:

FIG. 1 is a central vertical section of a rotary combustion engine showing the rotor positioned within the outer body in combination with a preferred embodiment of the fuel injection system of the present invention; and FIG. 2 is a sectional view of the rotary combustion engine taken along the line 2—2 of FIG. 1 and showing the fuel injection nozzle in section and a portion of the air intake passage in section.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

In accordance with the invention, a rotary combustion engine and a novel fuel injection system for use in combination with the engine are provided. As embodied, and as shown in FIGS. 1 and 2, the present preferred embodiment of this invention includes a rotary combustion engine comprising a generally triangular rotor 10 having arcuate sides which is eccentrically supported for rotation within an outer body 12.

As shown in FIGS. 1 and 2, and as here preferably embodied, the rotor 10 rotates on an axis 14 that is eccentric from and parallel to the axis 16 of the curved inner surface of the outer body 12. The distance between the axis 14 and 16 is equal to the effective eccentricity of the engine and is designated $e$ in the drawings. The curved inner surface 18 of the outer body 12 has basically the form of an epitrochoid in geometric shape and includes two arched lobe-defining portions or lobes.

As embodied, the generally triangular shape of the rotor 10 corresponds in its configuration to the "inner envelope" or the maximum profile of the rotor which will permit interference-free rotation of the rotor 10 within the outer body 12.

In the form of the invention illustrated, the outer body 12 comprises a peripheral wall 20 that has a curved inner surface 18, and a pair of axially-spaced end walls 22 and 24 that are disposed on opposite sides of the peripheral wall 20 and secured thereto.

The end walls 22 and 24 support a shaft 26, the geometric center of which is coincident with the axis 16 of the outer body 12. This shaft 26 is supported for rotation by the end walls 22 and 24 on bearings 28. A shaft eccentric 30 is rigidly attached to or forms an integral part of the shaft 26, and the rotor 10 is supported for rotation or rotatably mounted upon the shaft eccentric 30 by a rotor bearing 32 that is fixed to the rotor.

As shown in FIG. 2, an internally-toothed ring gear 34 is rigidly attached to one end face of the rotor 10. The ring gear 34 is in mesh with an externally-toothed gear or pinion 36 that is rigidly attached to the stationary end wall 22 of the outer body 12.

From this construction, it may be observed the gearing 34 and 36 does not drive or impart torque to the shaft 26, but merely serves to index or register the position of the rotor 10 with respect to the outer body 12 as the rotor rotates relative to the outer body and removes the positioning load which would otherwise be placed upon the apex portions of the rotor 10.

As shown most clearly in FIG. 1, the rotor 10 includes three apex portions 38 that carry radially movable sealing members 40. The sealing members 40 are in substantially continuous gas-sealing engagement with the inner surface 18 of the outer body 12 as the rotor 10 rotates within and relative to the outer body 12.

By means of the rotation of the rotor 10 relative to the outer body 12, three variable volume working chambers 42 are formed between the peripheral working face 44 of the rotor 10 and the inner surface 18 of the outer body 12.

As embodied in FIG. 1, the rotation of the rotor relative to the outer body is counterclockwise and is so indicated by an arrow.

A spark plug 46 is mounted in the peripheral wall 20 of the outer body 12, and at the appropriate time in the engine cycle, the spark plug 46 provides ignition for a compressed combustible mixture that, on expansion, drives the rotor in the direction of the arrow.

Also as shown in FIG. 1, one lobe of the epitrochoidal inner surface 18 is provided with an air intake port 48 and the other lobe is provided with an exhaust port 50. As the rotor 10 rotates, a fresh air charge is drawn into the appropriate working chamber 42 through the intake port 48 and mixes with injected fuel. This mixed charge is then successively compressed, ignited, expanded, and finally exhausted through the exhaust port 50.

All four successive phases of the engine cycle: intake, compression, expansion, and exhaust, take place within each one of the variable volume working chambers 42 each time the rotor 10 completes one revolution within the outer body and for each revolution of the rotor, the engine completes a cycle.

The working faces 44 of the rotor 10 are provided with cut-out portions or channels 52 that permit combustion gases to pass freely from one lobe of the epitrochoidal inner surface 18 to the other lobe, when the rotor is at or near the dead center of maximum compression position. A desired compression ratio of the engine may be attained by appropriate proportioning of the volume of the channels 52.

Since the gear ratio between the rotor ring gear 34 and the outer body gear pinion 36 is 3:2 each time the rotor 10 completes one revolution about its own axis 14, the shaft 26 rotates 3 times about its axis 16.

Within the rotary combustion engine there is an area of the inner surface 18 at which the pressure is always less than ambient or atmospheric pressure. As shown in FIG. 1, this characteristic of the pressure at the inner surface (a pressure less than the ambient pressure) exists at a location on the inner surface 18 that is defined by the area that is swept by an apex seal in moving from approximately 45° on each side of the minor housing diameter in the zone of the intake and exhaust ports. The exact values at which pressure at the inner surface 18 will always be less than ambient pressure depends on the angles at which the intake port opens and closes.

As stated above, a portion of the inner surface 18 always exhibits a pressure that is less than ambient pressure, and this characteristic of the engine makes it possible to create a low cost, direct, and continuous fuel injection system for the rotary combustion engine that avoids any need for a high pressure fuel nozzle. Since the pressure in the working chamber of the rotary combustion engine in the area of the inner surface just described is always below atmospheric or ambient pressure, it is not necessary to provide a pressurized fuel nozzle; the differential pressure between the fuel inlet of the nozzle and the discharge point of the fuel nozzle need only be high enough for proper functioning of the fuel metering device, as will be more fully explained below.

In accordance with the invention, a novel fuel injection system is provided for use in combination with the rotary combustion engine; this fuel injection system includes means for creating fuel pressure. As embodied in the preferred embodiment shown, this means for supplying fuel pressure comprises a fuel pump 54 and a bypass valve assembly generally designated as 56. As preferably embodied, the fuel pump 54 comprises an inexpensive conventional gear pump. This pump 54 pumps fuel from the tank 58 into the fuel line 60.

As preferably embodied, the bypass valve assembly 56 comprises a housing 62, an adjustable spring 64, a diaphragm 66, an ambient pressure sensing line 68, a fuel return line 70 leading back to the tank 58, and a control valve 72 that moves responsive to movement of the diaphragm 66. The ambient pressure sensing line 68 is connected at one end to the air intake passage 49 above the venturi 80, and it thus senses carburetor top deck pressure, or ambient pressure. The other end of the line 68 is connected to an upper chamber 74 of the bypass valve assembly 56. The fuel line 60 upon leaving the pump 54 forks into two branches. One branch ultimately leads to the working chamber of the rotary combustion engine, while the other branch leads into a lower chamber 76 of the bypass valve assembly 56.

In operation, the bypass valve assembly 56 controls the fuel pressure in the fuel line 60 by discharging fuel in excess of engine requirements back to the fuel source. The excess fuel is received from the fuel line 60 and permitted to flow through the lower chamber 76 and valve 72 to the fuel return line 70 and then back to the tank 58. The spring 64 applies a load on the diaphragm 66 such that the desired fuel pressure multiplied by the area of the diaphragm 66 is equal to the load of the spring 64. The upper chamber 74 of the bypass valve assembly 56 is subjected to ambient or carburetor top deck pressure via the line 68. The spring 64 thus establishes a pressure in the line 60 at a value above ambient pressure. The adjustment screw 78 permits adjustment of the load applied by the spring 64 and this in turn permits adjustment of the pressure in the fuel line 60.

In accordance with the invention, means are provided for controlling the fuel flow to the engine as a function of the differential between the pressure in the venturi throat 80 of the air intake passage 49 and the ambient pressure or carburetor top deck pressure as measured at 82 in the air intake passage 49. As embodied and as shown in FIG. 1, this fuel control means comprises a fuel control assembly designated generally as 84. The fuel control assembly 84 comprises an upper chamber 86 and a lower chamber 88, an adjustable spring 90, a diaphragm 92, separating the upper chamber 86 and the lower chamber 88, a pressure sensing line 94, a second pressure sensing line 96, a fuel chamber 98, and a valve 100. The valve 100 is connected to the diaphragm 92 and moves responsive to movement of the diaphragm. The spring 90 applies a load to the diaphragm 92, and this load may be adjusted by means of the adjusting screw 102. One end of the pressure sensing line 94 is connected to the section of the air intake passage 49 immediately above the venturi throat 80, and the point of connection is designated as 82; the other end of the pressure sensing line 94 is connected to the lower chamber 88 of the fuel control assembly 84. The other pressure sensing line 96 of the fuel control assembly 84 is connected at one end to the venturi throat 80 of the air intake passage 49 and at its other end to the upper chamber 86.

In operation, the fuel control assembly 84 controls the amount of fuel flow to the engine as a function of the differential between the venturi throat pressure and the carburetor top deck pressure. Many different means of fuel control assemblies could be used to accomplish this purpose. In the embodiment shown, however, the fuel valve 100 is opened against the spring 90 responsive to the force exerted on the spring 90 by the diaphragm 92. The amount of force exerted by the diaphragm 92 against the spring 90 is proportional to and is a function of the differential in the pressure at the venturi throat and carburetor top deck pressure, and this differential is applied across the diaphragm 92 by means of the two pressure sensing lines 94 and 96.

As can be seen from study of FIG. 1, as the differential between carburetor top deck pressure and venturi throat pressure increases, the force exerted by the diaphragm 92 against the spring 90 is also increased; this increase in force causes the diaphragm 92 to move upward against the spring 90 to further open the fuel control valve 100 as the differential increases. The fuel control valve 100 may be contoured to measure a scheduled fuel flow as a function of air flow when the normal pressure drop or loss of head across the fuel control valve 100 is known.

As the fuel control valve 100 moves upward responsive to increase in the differential more fuel flows from the line 60 into the fuel chamber 98 and through the fuel line 104.

In accordance with the invention, means are provided for continuously injecting fuel directly into the working chambers of the engine. As embodied, and as shown, this means comprises a fuel injection nozzle designated generally as 106. This fuel injection nozzle in turn comprises in one assembly a restricted fuel orifice 108, air holes 110, and fuel-air orifice 112. This fuel nozzle assembly provides a predictable back pressure on the fuel volume control which is indepedent of engine operating conditions.

The area of the fuel orifice 108 is selected to provide a low back pressure at idle fuel flows; the back pressure must still be low enough, however, at maximum fuel flow to make the design of the fuel pump 54 low cost. Since the pressure drop across the fuel orifice 108 varies as the square of the flow and since a reasonable flow range is 20:1, a back pressure range of 400:1 must be accommodated. Low cost fuel pumps can be made which will supply fuel at 200 p.s.i. but above this pressure the pump cost increases rapidly. An ideal pressure drop across the fuel orifice 108 at idle is thus 0.5 p.s.i. A differential pressure across the fuel orifice 108 of such a low value at idle would be sensitive to vacuum fluctuations in intake pressure and could thus affect the accuracy of the metered fuel flow.

To avoid the undesirable condition just referred to, air holes or passages 110 are included in the nozzle assembly 106. These air passages 110 enter the fuel passage immediately downstream of the fuel orifice 108 in a mixing chamber 109 and serve to insure that the discharge point of the fuel nozzle 108 is at all times near atmospheric pressure regardless of vacuum fluctuations in engine intake pressure. The air passages 110 thus insure that the amount of fuel injected into the engine chambers depends solely on the metering system pressure.

Just downstream from the mixing chamber 109 is the fuel-air orifice 112. Under all conditions of intake vacuum pressure in the area of the inner surface of the outer body in which the fuel nozzle assembly 106 is located the atomization of the fuel is enhanced by mixing of air and fuel in the mixing chamber and through the fuel-air orifice 112. At idle the volume of air passing through the fuel-air orifice 112 represents only a minor proportion of the total volume of air used at closed throttle for idling.

A butterfly valve 114 is shown in the air intake passage 49 for controlling the volume of air that is fed to the engine through the air intake port 48. As the valve 114 is opened, a greater volume of air flows through the air intake passage 49 and the air intake port 48. The increased volume of air flowing through the air intake passage 49 will create a greater differential in pressure between the venturi throat 80 and the carburetor top deck pressure at 82, and this increase in differential will, in turn, cause a greater volume of fuel flow to be pumped through the value 100 in the fuel control assembly and into the engine through the fuel nozzle assembly 106.

As described above, this invention provides a low pressure fuel injection system with the fuel injection nozzle discharging directly into the engine working chambers. Previously known low pressure fuel injection systems have been designed to provide a discharge nozzle upstream of the intake port. In the present invention, however, a low pressure continuous fuel injection system is provided that injects fuel directly into the working chambers of the engine. This makes possible the use of low cost air atomizing fuel nozzles in conjunction with a low pressure fuel metering system. Many of the benefits of a high pressure system are thus attainable with this invention without the attendant high cost of a high pressure system.

In rotary combustion engines of the type illustrated in the preferred embodiment the area of the inner surface of the outer body in which the pressure will always be less than carburetor top deck pressure is defined by the area swept by an apex seal 40 from a point approximately 45° before the minor housing diameter in the vicinity of the exhaust port to a point approximately 45° after the minor diameter of the rotor housing in the vicinity of the intake port. The exact values of these angles within which the fuel injection nozzle may be located depend ultimately on the intake port 48 opening and closing positions. It has been found, however, that the fuel injection nozzle is ideally located in the wall of the outer body at approximately 25° from the minor diameter in the vicinity of the intake port. The location of the fuel injection nozzle at the 25° point minimizes any tendency for the injected fuel to cross over to the exhaust port 50 at the start of injection within the working chamber that has just exhausted as the leading apex seal for that chamber crosses the nozzle.

A location of the fuel nozzle at a point later than 45° from the housing minor diameter on the intake side is not very satisfactory, since at such angles the nozzle will feel the beginning of compression. At locations greater than 45° it would thus be necessary to use a pressurized fuel nozzle and the benefits of direct injection through a low pressure fuel nozzle would be lost.

This invention makes possible the location of a fuel nozzle for a low pressure continuous feed injection system within a limited range in the wall of the outer body of a rotary combustion engine. Within this limited range of locations, the working chamber pressure felt by the nozzle will always be below atmospheric pressure or carburetor top deck pressure; this phenomenon insures that the fuel and air mixture or atomized fuel from the fuel injection nozzle will always be carried into the engine chamber. Since the major portion of the intake port 48 itself is located within the desired range of possible locations, the injection nozzle can also optionally be located for discharge into the air intake passage 49, as well as for discharge directly into the working chambers of the engine.

This invention in providing for a low pressure continuous fuel injection system that injects fuel directly into the working chambers of a rotary combustion engine provides new, beneficial, and useful results. Vaporization of the fuel takes place within the engine working chambers; this helps to cool the engine and to improve the breathing of the engine by cooling the air charge downstream of the intake port 48. Also, by introducing the fuel directly into the working chambers of the engine, the normally encountered problems of manifold wetting and carburetor icing are avoided and eliminated.

Finally, the novel and improved fuel injection system of this invention insures that a predictable back pressure is exerted on the fuel control assembly and that this back pressure is independent of engine operating conditions.

The invention in its broader aspects is not limited to the specific mechanisms shown and described, but also includes within the scope of the accompanying claims any departures made from such mechanisms that do not sacrifice its chief advantages.

What is claimed is:

1. A rotary combustion engine having a hollow outer body and an inner body rotatable relative to the outer body cooperating with the outer body to form a plurality of working chambers therebetween that rotate about the axis of the outer body and cyclically vary in volume as the inner body rotates relative to the outer body; air intake passage means for the chambers; fuel supply means for supplying fuel from a fuel source to the engine chambers; the fuel supply means including means for sensing air flow through said air intake and for controlling fuel flow proportionally to said air flow, a fuel pump for establishing a fuel pressure greater than atmospheric pressure, and a fuel injection nozzle for continuously injecting fuel directly into the engine chambers responsive to the flow of air through the air intake passage means, the fuel injection nozzle being located within the wall of the outer body and opening at the inner surface of the outer body adjacent to and downstream from the air intake passage means.

2. The invention as defined in claim 1, in which the fuel supply means also includes a bypass valve assembly means responsive to ambient pressure and to fuel pump pressure to maintain fuel pressure to said nozzle above said ambient pressure at any flow rate.

3. The invention as defined in claim 2, in which the bypass valve assembly means comprises an adjustable valve means that opens responsive to fuel pressure established by the pump, and a return conduit for returning fuel from the discharge side of the pump to the fuel source through the adjustable valve.

4. The invention as defined in claim 1, which also includes a fuel conduit for transporting fuel from the pump to the engine chambers, and a fuel control means for controlling the amount of fuel permitted to pass through the fuel conduit in proportion to said flow of air.

5. The invention as defined in claim 4, in which the air intake passage means includes a venturi and in which the fuel control means includes an adjustable valve disposed in said fuel conduit, and in which the air flow sensing means includes a first pressure sensing means in the air intake passage above the venturi and a second pressure sensing means in the air intake passage at the venturi, and in which the fuel control means also includes means for opening and closing the valve responsive to the differential in pressures sensed by the first and second pressure sensing means, respectively.

6. The invention as defined in claim 5, in which the fuel control means includes a spring loaded diaphragm that is mechanically coupled to the valve so that the valve will move responsive to movement of the diaphragm, and in which the fuel control means also includes a venturi pressure chamber and an ambient pressure chamber, the two pressure chambers being separated by the diaphragm, the first pressure sensing means being connected to the ambient pressure chamber and the second pressure sensing means being connected to the venturi pressure chamber, whereby when the differential between the pressure in the venturi pressure chamber and the ambient pressure chamber increases, the diaphragm will move in a direction toward the venturi pressure chamber, and the valve will open by an additional amount responsive to the movement of the diaphragm.

7. The invention as defined in claim 6, in which the air intake passage means also includes an adjustable valve for selectively increasing or decreasing the area of the passage at a selected point to control the flow of air through the air intake passage.

8. The invention as defined in claim 1, in which the fuel injection nozzle has a restricted fuel orifice, an air mixing chamber downstream from the fuel orifice, an air passage connected at one end to the air mixing chamber and at its other end to the atmosphere prevailing outside the outer body of the engine, and a restricted fuel-air orifice downstream from the air mixing chamber, whereby the air mixing chamber is maintained at substantially atmospheric pressure to permit the fuel orifice to maintain a predictable back pressure on the fuel that is independent of engine operating conditions, and whereby the fuel upon leaving the fuel orifice is mixed with air and injected into the engine chambers through the fuel-air orifice in an air atomized condition.

9. A rotary combustion engine having a hollow outer body and an inner body rotatable relative to the outer body cooperating with the outer body to form a plurality of working chambers therebetween that rotate about the axis of the outer body and cyclically vary in volume as the inner body rotates relative to the outer body; air intake passage means for the chamber; fuel supply means for supplying fuel from a fuel source to the engine chambers; the fuel supply means including means for sensing air flow through said air intake and for controlling fuel flow proportionally to said air flow, a fuel pump for establishing a fuel pressure greater than atmospheric pressure, and a fuel injection nozzle for continuously injecting fuel directly into the engine chambers responsive to the flow of air through the air intake passage means, the fuel injection nozzle being located within the wall of the outer body and opening at the inner surface of the outer body in an area of the inner surface at which the existing pressure through the complete engine cycle is less than the atmospheric pressure obtaining outside the engine.

10. A fuel injection system for rotary combustion engines characterized by low pressure continuous fuel injection directly into the engine chambers, and physically attained by a combination comprising a rotary combustion engine having a hollow outer body and a rotor rotatable relative to the outer body and cooperating with the outer body to form a plurality of working chambers therebetween that rotate about the axis of the outer body and cyclically vary in volume as the rotor rotates relative to the outer body, air intake passage means for the chambers, fuel supply means for supplying fuel from a fuel source to the engine chambers, the fuel supply means including a fuel pump for establishing a fuel pressure greater than atmospheric pressure, a low pressure fuel injection nozzle for continuously injecting fuel directly into the engine chambers responsive to flow of air through the air intake passage means, and fuel control means for proportioning the flow of fuel to the flow of air, the fuel injection nozzle being located within the wall of the outer body and opening in an area of the inner surface at which the existing pressure is less than atmospheric pressure during the complete engine cycle.

No references cited.